June 15, 1965  W. B. AMMON  3,189,117
ARTICULATED VEHICLE
Filed Dec. 16, 1963  3 Sheets-Sheet 2
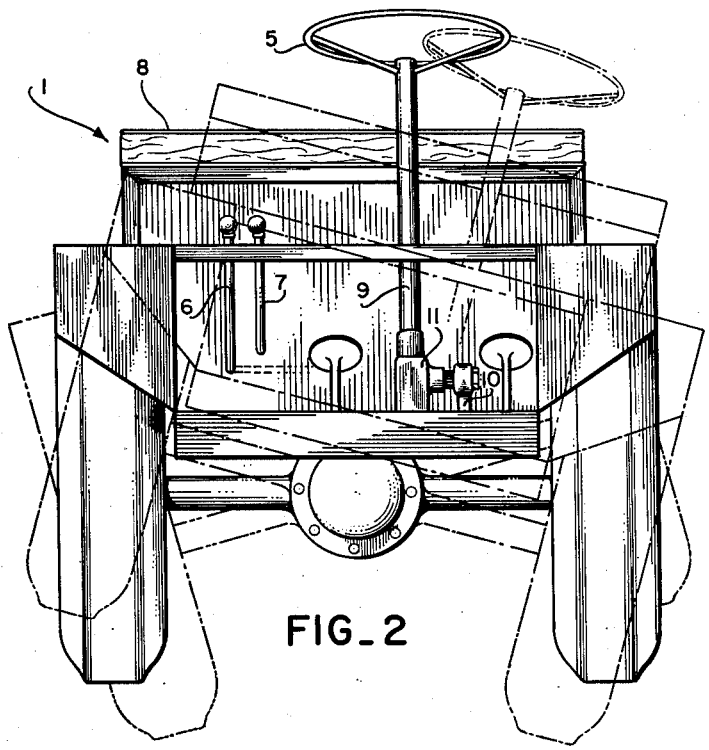
FIG_2
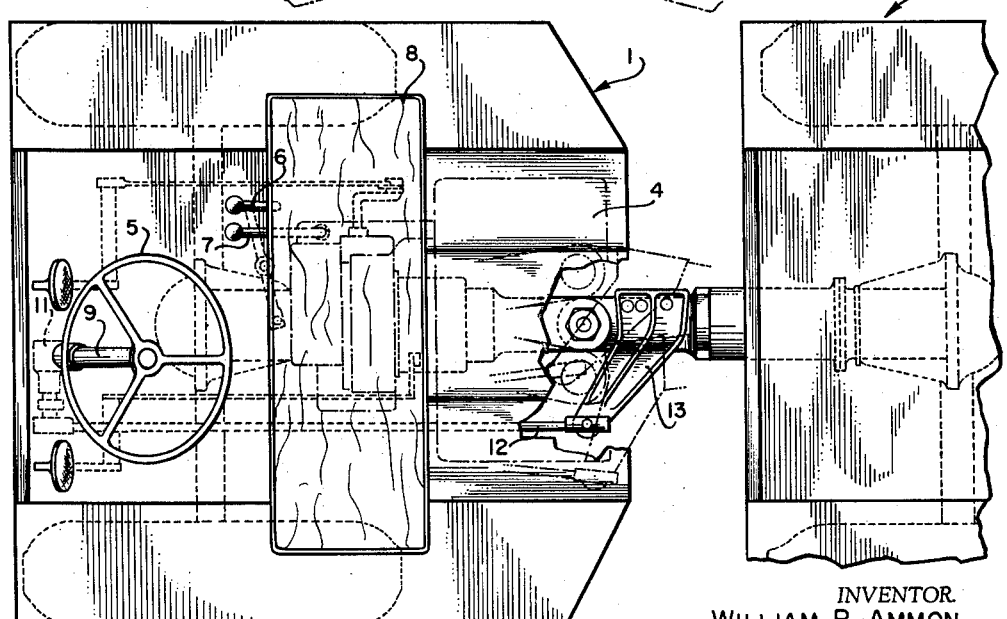
FIG_3
INVENTOR.
WILLIAM B. AMMON
BY *Albert K. Geen*
Attorney June 15, 1965 W. B. AMMON 3,189,117
ARTICULATED VEHICLE
Filed Dec. 16, 1963 3 Sheets-Sheet 3
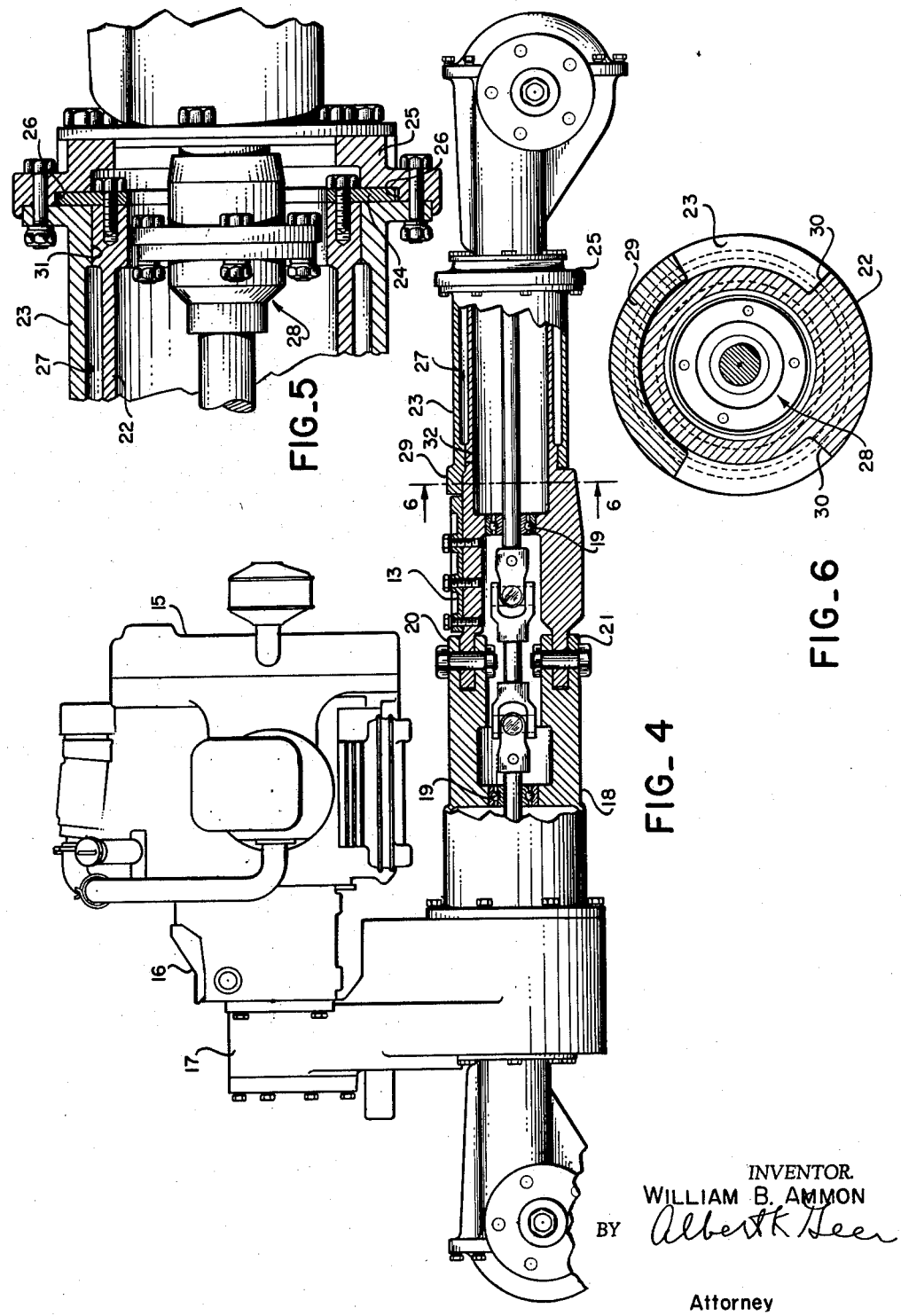
INVENTOR.
WILLIAM B. AMMON
BY
Attorney

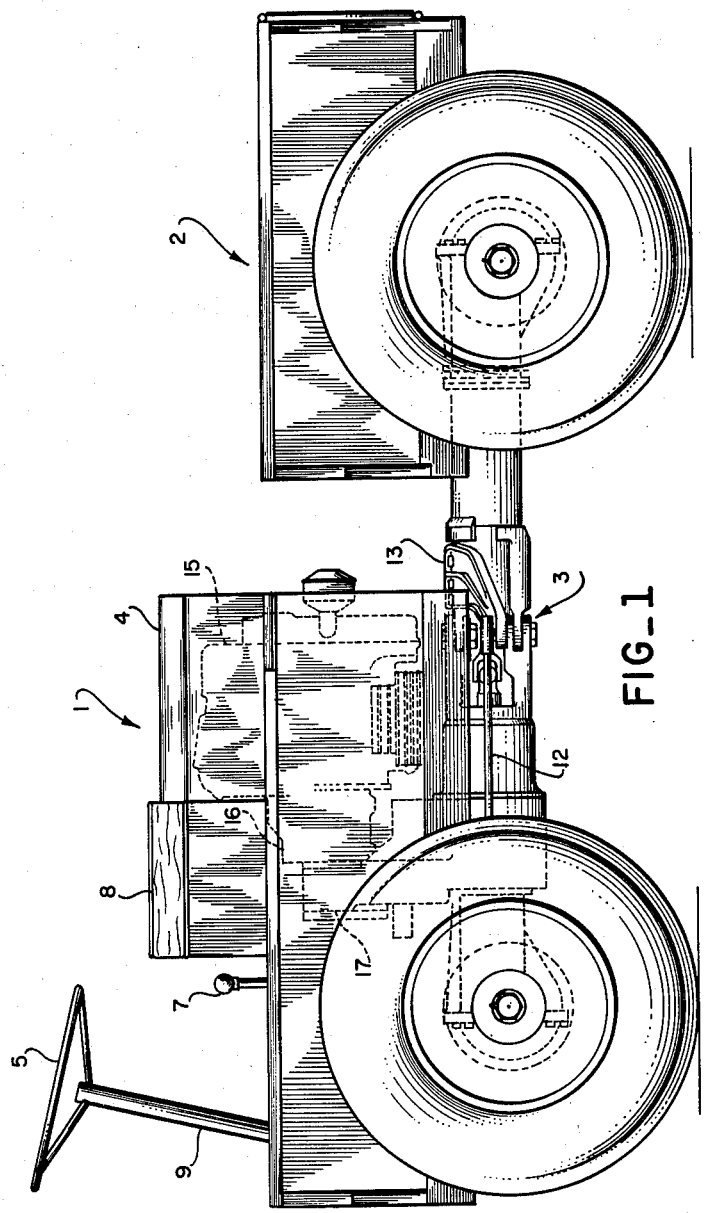

3,189,117
ARTICULATED VEHICLE
William B. Ammon, Tucson, Ariz., assignor to Dynaco Manufacturing, Inc., Tucson, Ariz.
Filed Dec. 16, 1963, Ser. No. 330,989
7 Claims. (Cl. 180—51)

This invention relates to an articulated vehicle and more particularly to an automotive vehicle for rugged terrain.

Presently known vehicles of the general type as herein described have limited utility, have complex couplings, lack stability in rough terrain, and/or are impractical to manufacture and market.

It is therefore a primary object of this invention to provide an improved articulated vehicle having a greatly simplified construction and substantially increased stability.

Another object of the invention is to provide a general utility vehicle of the class described wherein the operator is placed forward for better visibility.

A further object of the invention is to provide a simplified coupling for an articulated vehicle.

Another object of the invention is to provide a vehicle having a unique arrangement of the component parts to obtain the most favorable weight distribution.

These and other objects will become more apparent from the following detailed description when taken with the accompanying drawings in which:

FIGURE 1 is a lateral view of the vehicle embodying the invention.

FIGURE 2 is a front view of the vehicle shown in FIGURE 1.

FIGURE 3 is a partial plan view of the corresponding portion of FIGURE 1.

FIGURE 4 is a lateral view of the engine and drive assembly with the coupling unit shown in cross section. The superstructure of the vehicle has been omitted for clarity.

FIGURE 5 is a detail view in partial section of torque tube bearng unit.

FIGURE 6 is a sectional view taken on line 6—6 of FIGURE 4.

With reference to FIGURES 1 and 2 the vehicle illustrated comprises a forward unit 1, a rear unit 2 and a coupling assembly 3. Generally the coupling unit comprises a double clevis joint and a torque tube arrangement through which the drive shaft passes, to be described later. The forward unit supports the engine and transmission (shown in dotted line) located beneath the housing 4 and seat 8, respectively. Steering wheel 5 and gear shift levers 6 and 7 are located at the front of the vehicle. Crosswise seat 8 is placed above and to the rear of the front axle and also forward of the engine as illustrated.

FIGURE 3 illustrates the general layout of the forward portion of the vehicle in a plan view. It will be particularly noted that the engine, clutch housing and transmission are essentially centered eliminating an unbalance with respect to the center line. Further, when taken with FIGURE 1 it will be seen that the driver, engine transmission and clutch assembly are located between the front axle and the approximate center of the vehicle. As opposed to the conventional vehicle which either has the engine, transmission and drive-shaft in line necessitating an excess length or an overhang of the engine or has a complicated arrangement of the engine transmission with a weight unbalance with respect to the centerline, I have discovered that the arrangement described herein provides for a maximum stability for operation in rugged and usually unaccessible terrain.

The vehicle is provided with a steering wheel 5, as mentioned before, which comprises a steering post 9 which is connected to the pitman arm 10 by means of a worm and sector gear located in the housing 11. A drag link 12 is attached at one end to the free end of the pitman arm and at the other to a steering arm 13 on the torque tube behind the double clevis. Thus, it may be said that steering is provided by bending the vehicle at or near the mid-point. Gear shift levers 6 and 7 are shown as located conveniently to the driver and are connected to the transmission in the usual manner. Clutch and brake pedals are also illustrated.

The details of the drive assembly are illustrated in FIGURE 4. It is to be understood that the vehicle frame and other supports are omitted for purpose of clarity. Position within the vehicle may be noted from FIGURE 1, wherein the engine, clutch and transmission are shown in dotted line.

The engine 15 is coupled through the clutch assembly 16 to the transmission 17. The forward-reverse gear shift mechanism is preferably in the upper portion of the gear box, while a four speed shift may be located in the lower housing of the gear box. The transmission is coupled to a four-wheel drive through standard front and rear differential units.

Attached to the rear of the transmission housing is a forward torque tube 18 which supports the drive shaft in suitable bearings 19, and terminuates in an upper clevis 20 and a lower clevis 21. The rear torque tube is comprised of two parts, an inner tube 22 which attaches to the upper and lower clevis and the outer tube 23 which is coupled directly to the rear axle. As is noted particularly in FIGURE 1, the front and rear tubes are provided with open portions adjacent the clevis joint for access to universal joints on the drive shaft. The steering arm 13 to which the steering drag link is attached may be bolted to the top of the inner tube adjacent the upper clevis or can be made part of the inner torque tube.

At the rear of the inner tube, as illustrated in FIGURE 5, I preferably attach an annular bearing plate 24 which effectively provides a flange on the inner tube. The outer tube 23 and an annular ring 25 provided with an internal shoulder 26 are bolted or otherwise attached together, thereby enclosing the bearing plate. It is to be understood that the inner and outer tubes are free to rotate with respect to each other and therefore the annular shoulder area should be sufficient to permit the bearing plate to rotate freely and also to provide a clearance for lubrication of the bearing plate. Bearing surfaces 31 and 32 are provided between the inner and outer torque tubes and as indicated in FIGURES 4 and 5 these bearing surfaces are located forward of the bearing plate 24, and also at the forward end of the outer tube 23, respectively. The annular area 27 between the rear tubes is provided for lubricant. It will be noted that the rear end of the drive shaft is provided with a coupling unit 28 to facilitate disassembly. In the structure as described, all of the forward and reverse thrust is transferred through the bearing plate 24, whereas all transverse, up and down or lateral thrusts are taken up on the forward and aft bearing surfaces between the two torque tubes 22 and 23.

FIGURE 6 illustrates the stop arrangement between the inner and outer tubes. On the outer tube 23 a lug 29 is provided which rides along a cut out in the inner tube 22 and in the limiting position will abut against the stop areas 30 on either side. It is preferred that the stops permit at least 150° rotation. As shown the stops permit the front and rear axles to be rotated approximately perpendicular to each other.

It is believed readily apparent that a vehicle having a unique construction and improved stability has been illustrated and described. With reference to FIGURE 1, it can be seen that the driver is placed well forward on the vehicle. In this position the driver or operator has better visibility of the actual travel of the wheels of the vehicle over rugged terrain. Also all components such as engine, transmission are located in a new arrangement directly over and/or in alignment with the center line of the vehicle.

While a specific embodiment of the invention has been shown and described, it should be understood that certain alternations, modifications and substitutions may be made to the instant disclosure without departing from the spirit and scope of the invention as defined by the appended claims.

I claim:

1. In an articulated vehicle having a four wheel drive, the combination comprising a forward axle and a rear axle, a forward torque tube attached to the forward axle and having a clevis joint at the rear thereof, a rear torque tube consisting of an inner tube and an outer tube in concentric relationship, the inner tube being attached at one end to the clevis joint and having an annular bearing plate at the other, means including the outer tube for rotatably connecting the bearing plate to the rear axle, an engine, clutch and transmission located adjacent to and directly over the forward torque tube, at least a portion of the transmission constituting a part of the forward torque tube, an operator's seat mounted above the transmission and steering means located adjacent said seat, said engine, clutch, transmission and operator's seat further being horizontally positioned between the forward axle and the clevis joint.

2. The invention as defined by claim 1, wherein said forward and rear torque tubes enclose and support a drive shaft for supplying power to the forward and rear axles.

3. The invention as defined in claim 1, wherein the inner and outer tubes are concentric and include bearing surfaces at either end of the overlap therebetween.

4. In an articulated vehicle the combination of a drive shaft and coupling unit and having transmission means for providing power to the drive shaft and forward and rear axles to which the drive shaft is coupled comprising a forward torque tube, including at least a portion of the transmission housing, attached to the forward axle, the free end of the forward torque tube terminating in a double clevis joint, a first tube attached at one end thereof to the double clevis joint, an annular bearing plate attached to the other end of the first tube and extending uniformly and concentrically from said first tube and forming a flange thereon, a second tube concentric with and overlapping at least the rear portion of the first tube, said first and second tubes having bearing surfaces therebetween, an annular ring having an annular shoulder attached to the second tube and enclosing the flange of said bearing plate on said first tube, and means attaching the annular ring to the rear axle.

5. The invention as defined in claim 4, wherein the forward torque tube and the first tube include support means for the drive shaft.

6. The invention as defined in claim 4, wherein the second tube is provided with a flange on the rear end thereof, said annular ring is fastened to said flange and said bearing plate is rotatingly enclosed between the flange on the second tube and said annular shoulder on said annular ring.

7. The invention as defined in claim 4, further including stop means on the first and second tubes to permit a limited relative rotation of the tubes.

References Cited by the Examiner

UNITED STATES PATENTS

| | | | |
|---|---|---|---|
| 2,468,316 | 4/49 | Waters | 180—54 |
| 2,766,052 | 10/56 | Nash | 280—109 |
| 2,827,715 | 3/58 | Wagner | 180—51 X |

FOREIGN PATENTS

| | | |
|---|---|---|
| 486,449 | 11/53 | Italy. |
| 1,111,032 | 7/61 | Germany. |

A. HARRY LEVY, *Primary Examiner.*